United States Patent [19]

Hansen

[11] Patent Number: 4,497,217

[45] Date of Patent: Feb. 5, 1985

[54] CLUTCH PEDAL OPERATING THROUGH A FORE AND AFT SHAFT IN A FIRE WALL OF A VEHICLE

[75] Inventor: Kenneth N. Hansen, Waukesha, Wis.

[73] Assignee: Allis-Chalmers Corp., Milwaukee, Wis.

[21] Appl. No.: 519,143

[22] Filed: Aug. 29, 1983

Related U.S. Application Data

[60] Division of Ser. No. 292,650, Aug. 13, 1981, Pat. No. 4,426,890, which is a continuation of Ser. No. 73,254, Apr. 7, 1979, abandoned.

[51] Int. Cl.³ .............................................. G05G 1/14
[52] U.S. Cl. .................................................... 74/512
[58] Field of Search ................... 74/474, 478, 480 R, 74/512, 513; 192/13 R, 99 S; 180/333, 315

[56] References Cited

U.S. PATENT DOCUMENTS

| | | | |
|---|---|---|---|
| 1,984,015 | 12/1934 | Ganz | 180/315 |
| 2,129,851 | 9/1938 | Lee | 180/315 |
| 2,340,339 | 2/1944 | Nicol | 192/13 R |
| 2,712,359 | 7/1955 | Kramer | 74/513 X |
| 2,753,008 | 7/1956 | Peirce | 180/90.6 |
| 3,050,163 | 8/1962 | Dhulcq | 74/480 R X |
| 3,403,573 | 10/1968 | Westby | 180/315 |
| 4,014,419 | 3/1977 | McKnight | 74/478 X |
| 4,024,937 | 5/1977 | Hoepfl et al. | 192/13 R |
| 4,129,047 | 12/1978 | Dornan | 74/474 |
| 4,194,720 | 3/1980 | Callaghan et al. | 74/512 X |

FOREIGN PATENT DOCUMENTS

| | | | |
|---|---|---|---|
| 917587 | 7/1954 | Fed. Rep. of Germany | 74/512 |
| 1005927 | 9/1965 | United Kingdom . | |

Primary Examiner—Kenneth J. Dorner
Attorney, Agent, or Firm—Arthur L. Nelson

[57] ABSTRACT

A clutch pedal pivoting a fore and aft shaft mounted in a fire wall for transmission of the clutch actuating force through the fire wall for disengaging and engaging a vehicle clutch.

9 Claims, 5 Drawing Figures

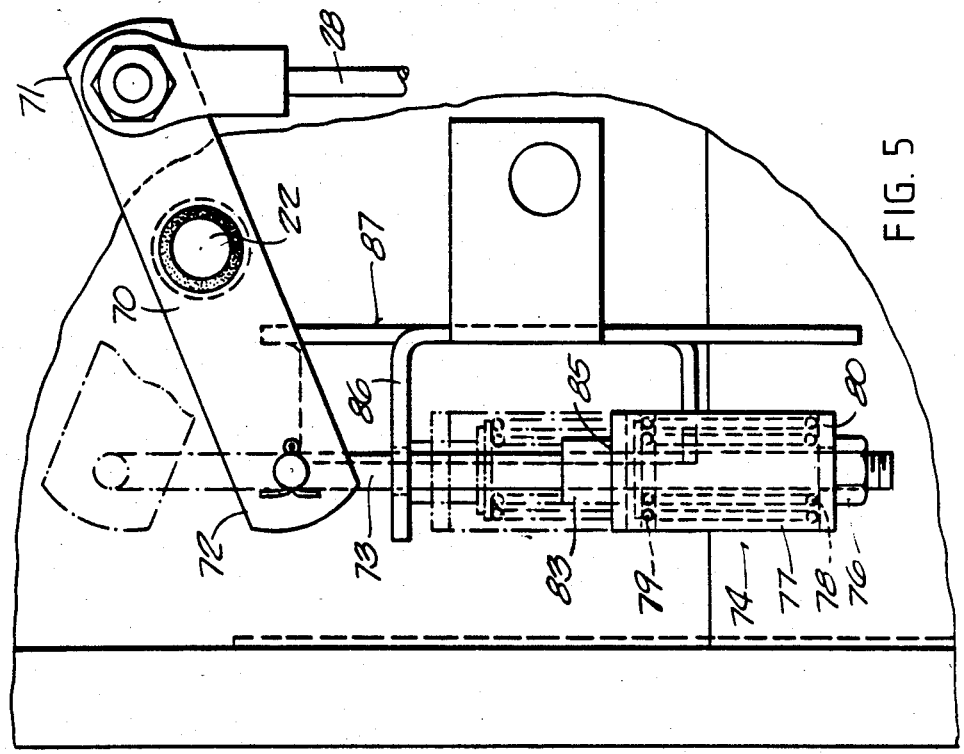
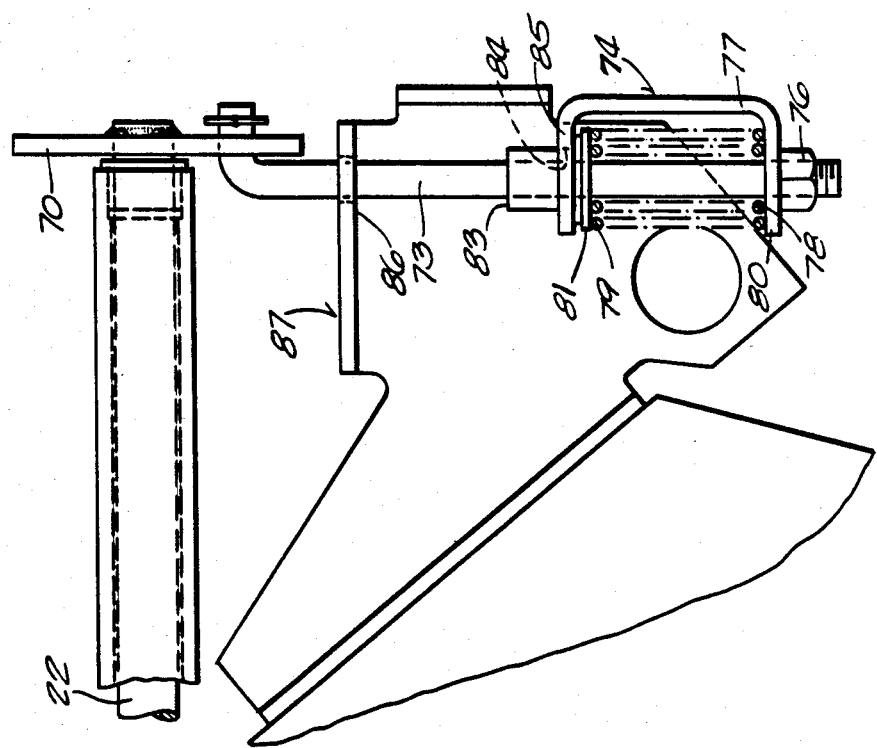

CLUTCH PEDAL OPERATING THROUGH A FORE AND AFT SHAFT IN A FIRE WALL OF A VEHICLE

This is a division of application Ser. No. 292,650, filed Aug. 13, 1981, now U.S. Pat. No. 4,426,890, which was a continuation of application Ser. No. 073,254, filed Apr. 7, 1979, now abandoned.

This invention relates to a vehicle clutch and more particularly to a clutch actuating device including a clutch pedal pivotally mounted on a transverse axis operating a fore and aft shaft pivoting in a fire wall of a vehicle and transmitting the clutch actuated force through the fire wall for engaging and disengaging the vehicle clutch.

Conventional clutch pedals pivot on a support structure and may operate a push-pull cable which extends forwardly through a rubber grommet in the fire wall or a rod running through a slit in the foam rubber pad. Prior art clutch pedals may have provided an inadequate air and noise seal because of the inconsistent fit or lack of a foolproof assembly procedure which does not assure a positive seal. A clutch actuating push rod or cable, as it extends through the fire wall, often required a change in the force direction to engage or disengage a clutch.

Accordingly, the present invention provides a clutch pedal pivotal on a transverse axis connected to a link pivoting a shaft on a fore and aft axis which extends through the fire wall to engage and disengage the clutch. The pivotal shaft operates a lever which requires limited space in the engine compartment side of the fire wall to engage or disengage the clutch. The bearing for the shaft, when assembled in the manufacturing procedure, provides a positive seal.

It is an object of this invention to provide a clutch or brake pedal on a vehicle pivoting on a transverse axis for pivoting a fore and aft shaft extended through the fire wall for transmission of the clutch disengaging and engaging force.

It is another object of this invention to provide a clutch pedal pivotal on a transverse axis for pivoting a clutch operating shaft pivotal on a longitudinal axis for transmitting the clutch disengaging and engaging force through the fire wall to operate the clutch.

It is a further object of this invention to provide a clutch and brake pedal pivotally mounted on a transverse axis pivoting a force transmitting shaft pivotally mounted on the fire wall on a fore and aft axis for transmitting the actuating force to the engine compartment for operating a clutch and brake.

The objects of this invention are accomplished with a clutch pedal pivotally supported on the fire wall for pivotal movement on a transverse axis. A pivotal shaft is supported on a fore and aft axis on the fire wall for transmitting the clutch engaging force through the fire wall for engaging and disengaging the clutch. A connecting link from the clutch pedal drives an arm on the shaft which extends into the engine compartment to operate the clutch. The bearing assembly in the fire wall is sealed to attenuate sound transmission from the engine compartment to the operator station.

Referring to the drawings, the preferred embodiment of this invention is illustrated.

FIG. 4 is a side view of a modification showing a brake engagement sensing device.

FIG. 5 is a rear view of the modification.

Figure 1:
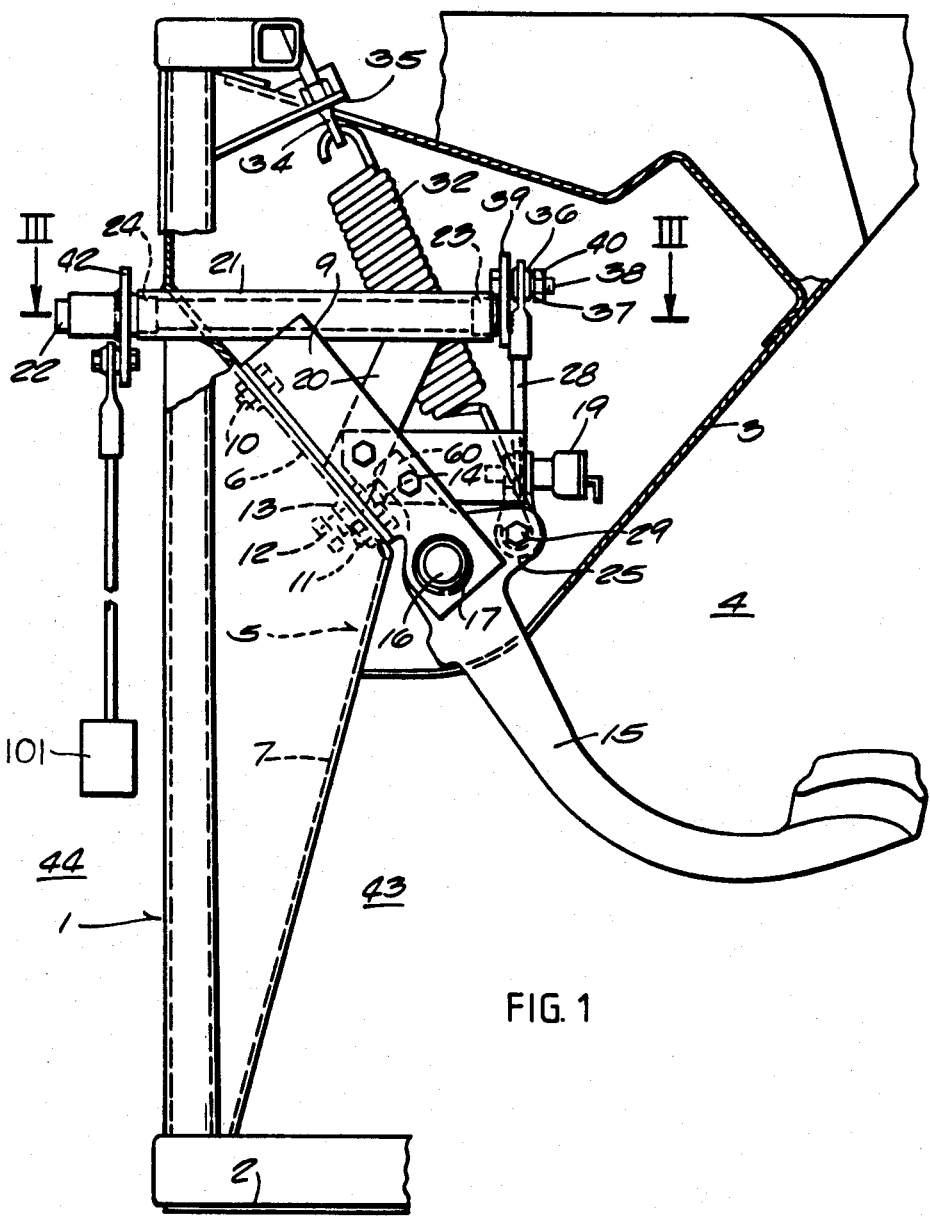
FIG. 1 is a side elevation view of the foot pedal supported by the fire wall and operating a fore and aft shaft extending through the fire wall.

Referring to the drawing, a fire wall 1, a platform 2 and a control console 3 generally define the operator station 4. The fire wall 1 is formed with a recess 5 in the fire wall in which the panel 6 extends rearwardly and downwardly to join the panel 7 which extends rearwardly and upwardly to form a continuous wall in the passenger compartment. The bracket 9 is mounted by a plurality of bolts of which bolts 10 and 11 are shown. The bracket 9 is mounted on the inclined panel 6 of the fire wall 1. The bolt 12 and lock nut 13 form a stop 14 for the pedal 15. The pedal 15 is pivotally mounted on the pin 16 which is supported on the bracket 9. The pin 16 is held by the snap rings 17 and 18 on opposing sides of the bracket 9 and pedal 15. The lug 60 on the pedal 15 extends upwardly to operate the neutral start switch 19.

The brace 20 is connected to the panel 6 and supports a fore and aft extending bearing in the form of a sleeve 21. The sleeve 21 extends through the fire wall 1 and supports the pivotal shaft 22. The pivotal shaft 22 is rotatably supported on the bushings or bearings 23 and 24 mounted in opposite ends of the sleeve 21. The corresponding opposite ends of the bearing 21 and shaft 22 are disposed in the engine compartment 44 and the operator station 4, respectively.

The arm 25 carries the spherical bushing 26 received in the spherical sleeve 27 on the link 28. Spherical bushing 26 is carried on the bolt 29 which is fastened by the nut 30 to the pedal 15. The bolt 29 extends beyond the spherical bushing to form a seat 31 for the return spring 32. The nut 30 retains seat 31 on the bolt 29. The return spring 32 extends upwardly to engage the eye bolt 34 fastened on the hanger 35 on the upper portion of the fire wall 1.

The connecting link 28 forms a spherical bearing end 36 which receives spherical bushing 37 carried on the bolt 38. The bolt 38 is fastened to an eccentric means in the form of an arm 39 secured to the shaft 22. The bolt 38 has a nut 40 which fastens spherical bushing 36 and the bolt to the arm 39. A modification of arm 39 is shown in FIG. 4 showing double arms 71 and 72 in which arm 72 operates a "brake actuating sensor." The sensor engages the brake actuating linkage as the brake is being actuated.

The clutch and brake pedal 15 is mounted on the operator station 43 side of the fire wall 1. The bar 42 is mounted in the engine compartment 44 side of the fire wall. The bar 42 extends transversely from the shaft and provides operating arms 45 and 46 adapted for operating a clutch mechanism and a brake mechanism if desired. The mechanism as shown is a sheathed cable 47 with the sheath 50 mounted on the bracket 48 and the cable 49 reciprocating in the sheath to operate a clutch 101 in a power shift transmission. Sheathed cable 51 having a sheath 55 is connected to arm 45 and operates brake 102 through cable 103.

Referring to FIGS. 4 and 5, the modification shows the fore and aft shaft 22 equipped with a cross member 70 forming arms 71 and 72. The arm 71 is operated by the link 28 from pedal 15. The arm 72 operates a push rod 73 connected to a brake engagement sensing device 74. When the brake pedal 15 is operated, the link 28 rotates the shaft 22. Shaft 22 operates the cables 49 and 103 which operate the clutch and brake 101 and 102, respectively.

The brake engagement sensing device 74 essentially includes the push rod 73 carrying nut 76 which supports the U-shaped member 77 extending above and below the springs 78 and 79. The springs 78 and 79 are precompressed between the base 80 of U-shaped member 77 and the washer 81 which forms spring seats. The flanged bushing 83 embraces the push rod 73 and is permitted to reciprocate within an opening 84 in the upper horizontal portion 85 of the U-shaped member 77. FIG. 4 shows precompressed springs 78 and 79 in the normal brake disengaged position. The phantom view in FIG. 5 shows the brake engagement sensing device engaging the stop 86 formed by the bracket 87 which normally supports the brake engagement sensing device 74. The flanged bushing 83 engages the upper portion 86 of the bracket 87 retarding the rotational movement of shaft 22 as the brake 102 is engaged. This provides the operator with a "feel" so that he senses when the brake is engaged. The clutch 101 has been previously disengaged and without the brake engagement sensing device the operator would not be aware of the phase of pedal 15 rotation for brake engagement.

Figure 2:
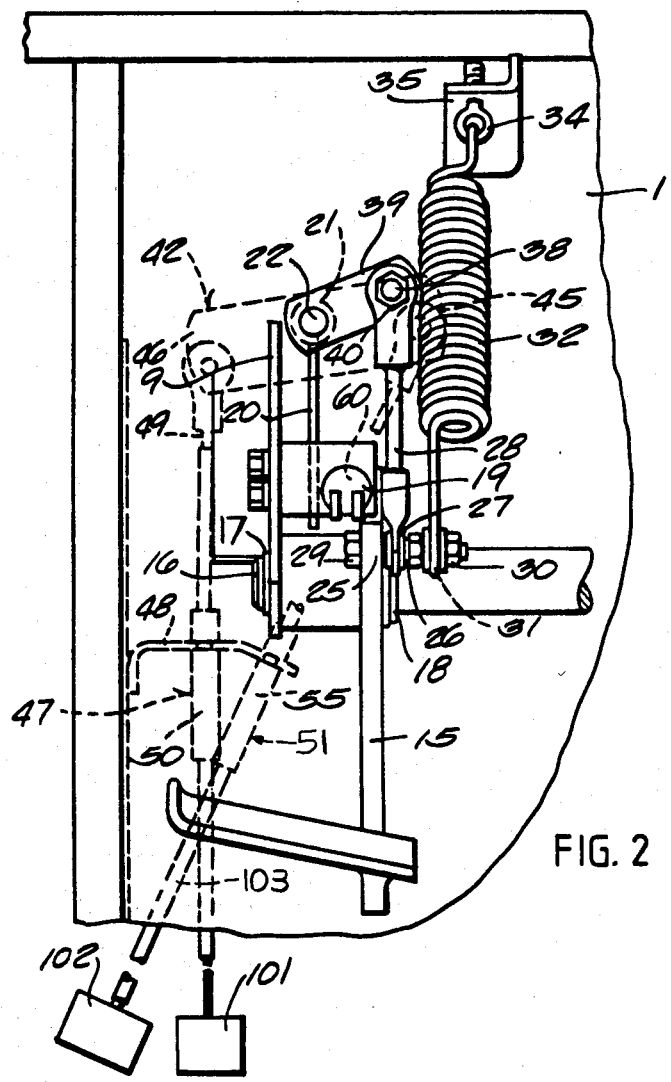
FIG. 2 is a rear elevation view showing the foot pedal and pivotal shaft shown in FIG. 1 mounted on the fire wall of the vehicle.
Figure 3:
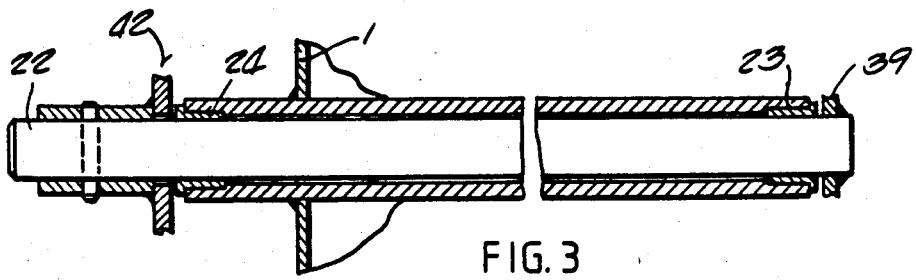
FIG. 3 is a cross section view taken on line III—III of FIG. 1.

The device operates in the following described manner. As the pedal 15 is depressed, it pivots in a clockwise manner as viewed in FIG. 1 placing tension on the spring 32. The arm 60 moves away from the pedal stop 14. The link 28 pulls downwardly on the arm 39 causing the pivotal shaft 22 to rotate in a clockwise manner as shown in FIG. 2. As the shaft moves clockwise, the bar 42 forming arms 45 and 46 rotates in the engine compartment to operate the vehicle clutch. The vehicle clutch 101 is operated through the cable 49 by moving the cable upwardly to disengage the clutch. The neutral start switch 19 is allowed to close as the pedal moves in a clockwise direction as shown in FIG. 1. The device is also adapted for operating a transmission brake 102. Continued movement of the pedal will, in turn, operate the brake 102 through the arm 45 through a similar cable 55. As the brake is depressed, the brake actuating linkage engages the brake engagement sensing device 74 which includes precompressed springs 78 and 79. The precompressed springs resist the downward movement of the pedal and the brake feel sensor is preset to indicate to the operator when the brake is being engaged.

When the pedal is released, the pedal 15 is returned by the spring 32. The spring 32 will return the pedal to its normally retracted position in which the arm 60 engages the stop 14. In this position, the clutch is again engaged because of the counterclockwise rotation of the bar 42. The brake is disengaged during the return movement of the pedal and the neutral start switch 19 is again opened as the pedal returns to its stopped position.

The embodiments of the invention in which an exclusive property or privilege is claimed are defined as follows:

1. A foot pedal assembly for operation in a vehicle comprising, means defining an operator station including a transverse fire wall between the operator station and an engine compartment, a pendent pedal, support structure on said fire wall pivotally suspending a pivotal end of said pendent pedal on a transverse axis, a return spring normally biasing said pedal to a return position, a pivotal shaft mounted on a pivotal fore and aft axis essentially normal to the transverse axis, a bearing pivotally supporting said shaft on said fire wall and providing sound attenuation around said shaft and reducing sound transmission through said fire wall, said bearing and shaft having corresponding opposite ends disposed in said operator station and said engine compartment, respectively, a link connected to the pivotal end of said pedal and to an eccentric means on said end of said shaft disposed in said operator station to pivot said shaft in response to pivotal movement of said pedal, a motion transmitting means connected to said end of said shaft disposed in said engine compartment, said motion transmitting means being adapted for operating an actuating means.

2. A foot pedal assembly for operation in a vehicle as set forth in claim 1 wherein said pedal defines a clutch pedal.

3. A foot pedal assembly for operation in a vehicle as set forth in claim 1 wherein said pedal defines a brake pedal.

4. A foot pedal assembly for operation in a vehicle as set forth in claim 1 wherein said eccentric means includes an arm secured to said pivotal shaft, and further comprising a spherical bearing connecting said arm with said link and a spherical bearing connecting said pedal with said link.

5. A foot pedal assembly for operation in a vehicle as set forth in claim 1 including, a return stop for stopping said pedal in its return position.

6. A foot pedal assembly for operation in a vehicle as set forth in claim 1 including, a lever connected to said pivotal shaft in the engine compartment.

7. A foot pedal assembly for operation in a vehicle as set forth in claim 1 including a sleeve extending through said fire wall defining a longitudinal axis coincidental with said bearing axis normal to said pivotal axis of said pedal, a plurality of bushings defining bearings in said sleeve, said sleeve embracing said bushings and pivotally supporting said pivotal shaft.

8. A foot pedal assembly for operation in a vehicle as set forth in claim 1 wherein said support structure including a bracket for supporting said pedal on said fire wall.

9. A foot pedal assembly for operation in a vehicle as set forth in claim 1 including a lever on said shaft in the engine compartment, means connecting said lever for engaging and disengaging a vehicle clutch.

* * * * *